Wildasin & Peek.
Churn.
No. 94,802.  Patented Sep. 14, 1869.
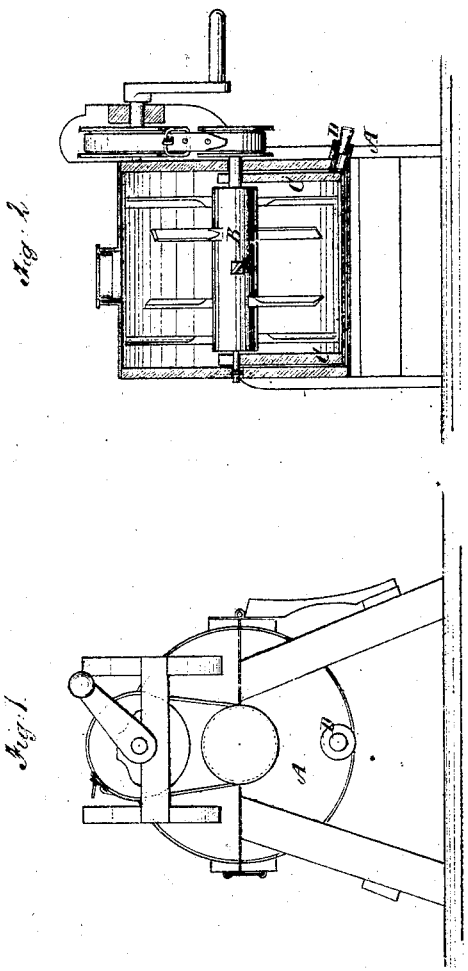
Witnesses:
Chas. Nida
Wm. F. Clark
Inventor:
J. E. Wildasin
J. A. Peek
per
Attorneys.

United States Patent Office.

J. H. WILDASIN AND J. A. PEEK, OF ST. CHARLES, IOWA.

Letters Patent No. 94,802, dated September 14, 1869.

IMPROVEMENT IN CHURNS.

The Schedule referred to in these Letters Patent and making part of the same.

*To all whom it may concern:*

Be it known that we, J. H. WILDASIN and J. A. PEEK, of St. Charles, in the county of Madison, and State of Iowa, have invented a new and improved Churn; and we do hereby declare that the following is a full, clear, and exact description thereof, which will enable others skilled in the art to make and use the same, reference being had to the accompanying drawings, forming part of this specification.

This invention relates to improvements in churns, and has for its object to provide churns better adapted for separating the buttermilk from the butter, when formed, and for working the same into a solid mass.

The invention consists in the application to the lower half of a cylindrical case, made in two parts, and having a rotary beater working therein, of an auxiliary semicircular case, with a perforated bottom, through which the buttermilk may be drawn off after the butter is formed, to facilitate gathering and solidifying the same.

Figure 1 represents an end elevation of my improved churn, and

Figure 2 represents a transverse sectional elevation of the same.

Similar letters of reference indicate corresponding parts.

A represents a hollow cylindrical case, made in two parts, divided at the centre, and hinged together in the usual way.

B represents the revolving agitator, consisting of a shaft and arms, the latter arranged with their faces obliquely to the cream, or the plane of rotation.

C represents the auxiliary semicircular hollow case, fitted to the lower half of the case A, and provided with a perforated bottom, as shown in fig. 2.

This case is fitted snugly to the other, but so as to be readily taken out for cleaning and other purposes.

The case A is provided with a passage, D, for drawing off the milk, stopped by a plug or otherwise.

When the butter has formed into small particles, the plug is withdrawn, and the buttermilk runs off, leaving the butter to settle together in the bottom of the case C, where it may be much more easily and quickly gathered into a solid mass, as required.

Having thus described my invention,

I claim as new, and desire to secure by Letters Patent—

The combination, with the case A of a churn, of the auxiliary case C, having a perforated bottom, when the case A is arranged for drawing off the buttermilk, substantially as specified.

J. H. WILDASIN.
J. A. PEEK.

Witnesses:
   THOS. T. ANDERSON,
   G. W. SCHNELLBACHER.